Nov. 8, 1927.

M. STOFFEL

WINCH FOR BARBED WIRE SPOOLS

Filed Dec. 11, 1925

1,648,568

Inventor:
Martin Stoffel
By E. Lundy Atty.

Patented Nov. 8, 1927.

1,648,568

UNITED STATES PATENT OFFICE.

MARTIN STOFFEL, OF McHENRY, ILLINOIS, ASSIGNOR OF ONE-HALF TO JOSEPH N. MILLER, OF McHENRY, ILLINOIS.

WINCH FOR BARBED-WIRE SPOOLS.

Application filed December 11, 1925. Serial No. 74,784.

My present invention relates to a winch structure upon which a spool containing barbed wire may be mounted and the rotation of the spool by rolling the structure along the ground will cause the barbed wire to be fed off the spool.

The principal object of my invention is to provide an apparatus of this character that is novel and simple in construction so that it will not readily get out of order; that is formed from sturdy parts few in number, which will insure its stability and reduce its production cost to a minimum so that it may be sold for a moderate price; that is dependable in performing the functions for which it has been designed; and that is easy to manipulate so that in use but one person is required to operate it to either unwind or wind the barbed wire on the spool.

I have provided a rectangular frame which at one end has means for rotatably mounting a spool or reel and at its opposite end has a handle-bar that permits the structure to be pulled or dragged behind the operator to unwind the wire from the spool. A hinged support, that may be folded up out of the way when not in use, is adapted to be opened out so as to rest upon the ground and elevate the journaling end of the frame and spool off the ground so that by attaching a crank to the spool or reel, the latter may be rotated to wind the wire upon said spool. It is well known that the winding or unwinding of a spool of barbed wire is a difficult task requiring the services of at least two persons, but with my apparatus the work may be done by one person and without any considerable labor.

I prefer to carry out my invention and to accomplish the divers objects thereof in substantially the manner hereinafter fully described and as more particularly pointed out in the claims, reference being made to the accompanying drawings that form a part of this specification.

In the drawings:—

Figure 1:
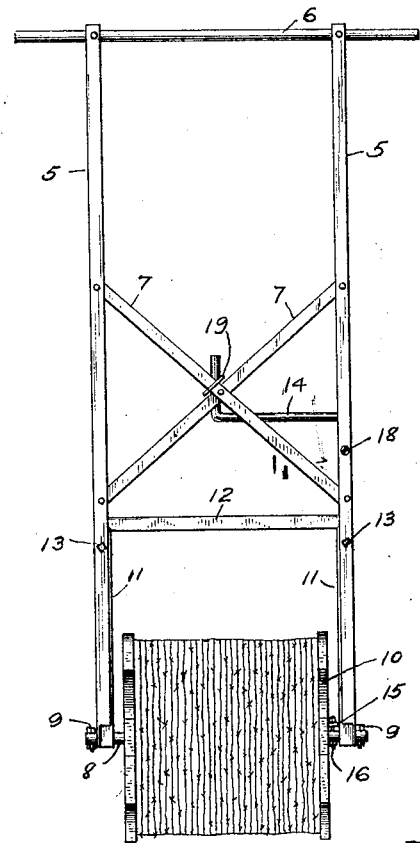
Figure 1 is a top plan of my improved device showing a spool of barbed wire thereon for unwinding.
Figure 2:
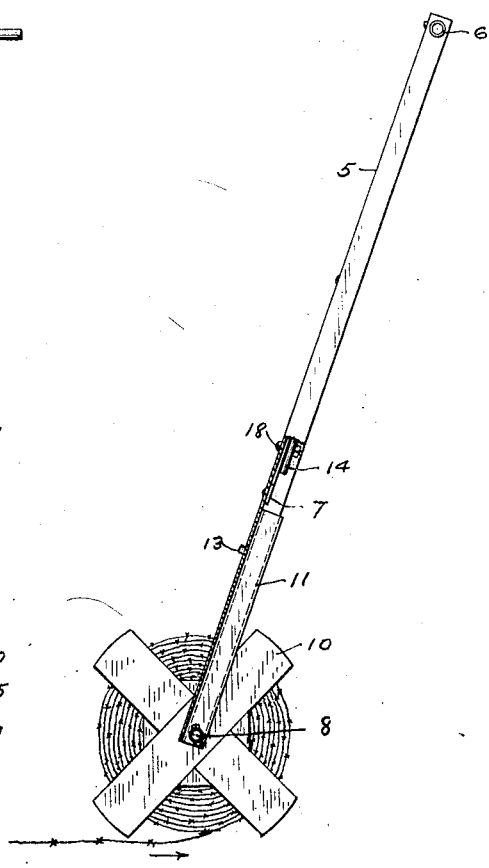
Figure 2 is a side elevation thereof the handle end of the frame being raised and illustrating the manner in which the wire is unwound from the spool.

The structure preferably comprises a rectangular frame having a handle at one end and a spindle at the opposite end and hinged on the spindle is a foldable support that may be dropped to prop up one end of the frame. The frame consists of a pair of angle-bars preferably of right-angle cross-section and arranged parallel to each other with the vertical flanges pendent with respect to the other of the horizontal flanges. At one end these rails 5 are connected by a transverse member in the form of a tube 6 the ends of which project beyond the planes of the rails 5 and provides a hand-grasp which the operator may take hold of to pull the structure over the ground when unwinding a reel of wire. The rails are also connected and braced intermediate their ends by diagonally disposed oblique straps that cross each other intermediate their ends and at their ends are bolted or riveted to the horizontal top flanges of the rails. At the end of the frame opposite the handle 6 there is provided a spindle or shaft 8 that is preferably rotatably mounted in the vertical flanges of the rails and which is prevented from accidental dislodgment by means of transverse pins, bolts or the like 9. When it is desired to unroll the wire, the spool 10 is mounted upon a spindle 8 between the rails and, by anchoring the free end of the wire, the operator may pull the structure along the ground in the direction it is desired to position the wire thereby permitting the wire to unreel and lie flat upon the ground, when the reel or spool has been unwound sufficient to place the required amount of wire on the ground it will be found that the wire will be comparatively taut and requires little or no stretching. This is due to two circumstances:—first, the spurs or barbs over the long length of wire will engage with the ground or the grass or other growth and act as a brake to prevent the wire pulling back towards the anchor, and second, the diameter of the spokes of the spool being greater than the diameter of the wire wrapped upon the spool will permit the spool to travel a greater distance at each rotation than the length unreeled by the same rotation and naturally will pull the wire taut. It will thus be seen that but one person is required to unwind a spool of wire with the present structure.

Figure 3:
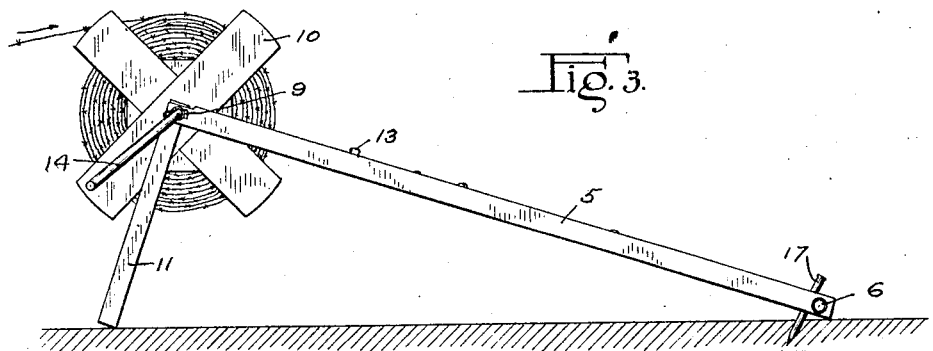
Figure 3 is a side elevation with the support in opened position and showing the relative positions of the parts when used to wind the wire upon the spool.

Whenever it is desired to rewind wire upon the spool the support is unfolded so as to elevate the reel from the ground. This support consists of two substantially parallel legs 11 of angle-metal similar to that from which the side rails 5 are fabricated and have the same disposition as said side rails so that the longitudinal corners of the legs will fit into or nest in the corners between the flanges of the side rails. The legs 11 are preferably connected at or adjacent their free ends by a cross piece 12, and for the purpose of convenience the legs and cross piece may be made from a continuous strip of angle-metal so that thereby a substantially U-shaped member is provided without the additional labor of forming joints. The ends of the legs opposite the cross piece are hingedly mounted upon the spindle or shaft 8 and when they are in a folded position they may be secured against accidental dislodgment by means of removable bolts or pins 13 that pass through the adjacent horizontal flanges of both the side rails and the legs. When the supporting members are unfolded and positioned as shown in Figure 3 of the drawings, the reel or spool 10 will elevate far enough above the ground to permit the same to be rotated by means of a movable crank 14 that is detachably mounted upon one of the ends of the shaft or spindle 8 and the latter may be readily connected to the spool or reel by driving a staple 15 into the wooden side piece of the reel and then passing a bolt or pin 16 through the staple and the spindle. When the wire is being wound as illustrated in Figure 3 the longitudinal movement of the frame and its support is prevented by means of an anchoring pin 17 driven into the ground back of the handle 6, or the handle may be fastened to a tree or fence-post or to a heavy vehicle so as to avoid the longitudinal movement of the frame under the pull exerted incident to the wire being drawn towards the structure. The structure in this position may also be utilized as a small hoist or for pulling light vehicles out of ditches, or ruts, or mud. For the purpose of convenience I secure the crank 14 when not in use to the rail of the side frame by bolts 18 and support the opposite end of the crank by means of a loose ring or loop 19 carried by one of the cross braces 7.

With the structure above described one operator may run-out any length of wire along the ground without other assistance, and the spool is conveniently handled even to the extent of being able to drag the same through bushes and under-brush and may be conveniently pulled under a fence, whereas the present process is to place a rod through the axis of the spool and two operators, one holding each end of the rod will unwind the same while carrying the entire weight of the spool and wire wound thereon.

What I claim as new is:—

1. A device of the character described comprising a frame consisting of longitudinal side-walls of L-section, cross-pieces at opposite ends thereof one of which provides a handle and the other of which provides a spindle upon which a reel is rotatably mounted, a U-shaped supporting member the legs of which are pivotally mounted on said spindle and are adapted to be normally folded parallel to and nest in the angle of the side-rails whereby the connecting element of said supporting member provides a transverse brace for said rails intermediate their ends, said supporting member legs adapted to be swung to a position to rest upon the ground and thereby elevate the reel above the ground to permit of the free rotation of the reel mounted on the spindle, and a crank detachable from said spindle for rotating the latter and said reel.

2. A device of the character described comprising a frame consisting of a pair of parallel side-rails of inverted L-section with their depending flanges outermost, cross-pieces at opposite ends thereof one of which provides a handle and the other of which provides a rotatable reel-mounting spindle, said cross-pieces being mounted in the depending flanges of said rails, obliquely disposed intersecting braces extending from side-rail to side-rail and secured thereto between the depending flanges of said rails, a reel supporting member consisting of an integral bar of L-shaped section and disposed with the vertical flanges outermost alongside the corresponding flanges of the main frame said bar bent substantially U-shape and adapted to be folded into the angular portions of the rails to seat therein intermediate the vertical flanges thereof, the ends of the legs of said supporting member being pivotally mounted upon said spindle whereby the structure may be opened to rest the opposite ends of the legs upon the ground to elevate the reel free of the ground, and a crank detachably mounted upon said spindle for rotating the latter when the reel is elevated.

3. A device of the character described comprising a frame consisting of parallel side-rails of angle-metal, cross-pieces at opposite ends thereof one of which provides a handle and the other of which provides a spindle for rotatably mounting a reel, a supporting member consisting of legs pivotally mounted on the frame and a transverse element connecting said legs, said legs adapted to be normally folded parallel to and nest in the angle-metal side-rails whereby the transverse element of the supporting member provides a transverse brace for said rails intermediate their ends, said supporting member adapted to be swung to a position to rest upon the ground and thereby elevate the reel above the ground to permit free rotation thereof, and a crank detachable from said spindle for rotating the latter and said reel.

Signed at McHenry, in the county of McHenry, and State of Illinois, this 16th day of November, 1925.

MARTIN STOFFEL.